US008852819B2

(12) United States Patent
Rich et al.

(10) Patent No.: US 8,852,819 B2
(45) Date of Patent: Oct. 7, 2014

(54) SYSTEM AND METHOD FOR MANAGING FUEL CELL OPERATING CONDITIONS IN A MOBILE COMMUNICATION DEVICE

(75) Inventors: David Gerard Rich, Waterloo (CA); Lyall Winger, Waterloo (CA); Chee-Ming Jimmy Wu, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1300 days.

(21) Appl. No.: 12/478,894

(22) Filed: Jun. 5, 2009

(65) Prior Publication Data
US 2010/0310947 A1 Dec. 9, 2010

(51) Int. Cl.
| | |
|---|---|
| H01M 8/00 | (2006.01) |
| H01M 10/48 | (2006.01) |
| H01M 6/36 | (2006.01) |
| H01M 8/06 | (2006.01) |
| H01M 8/04 | (2006.01) |
| G05B 21/00 | (2006.01) |
| G05D 23/00 | (2006.01) |
| G01D 18/00 | (2006.01) |
| G01D 21/00 | (2006.01) |
| G01P 21/00 | (2006.01) |
| G01R 35/00 | (2006.01) |

(52) U.S. Cl.
CPC ...... *H01M 8/04171* (2013.01); *H01M 2250/30* (2013.01); *Y02B 90/18* (2013.01); *H01M 8/04007* (2013.01); *H01M 8/04313* (2013.01); *Y02E 60/50* (2013.01)
USPC ............. 429/400; 429/90; 429/112; 429/413; 429/428; 429/430; 429/431; 429/432; 429/433; 429/408; 429/450; 700/266; 700/274; 700/299; 700/300; 702/85

(58) Field of Classification Search
CPC .......... H01M 8/04313; H01M 8/4007; H01M 8/04171; H01M 8/04492; H01M 8/04126; H01M 2250/30; Y02E 60/50; Y02B 90/18

USPC .......... 429/90, 112, 413, 428, 430, 431, 432, 429/433, 450, 408, 410, 400; 700/266, 271, 700/274, 276, 282, 292, 299, 300; 702/85, 702/106
See application file for complete search history.

(56) References Cited

U.S. PATENT DOCUMENTS

| 2,067,920 | A | * | 1/1937 | Heuser | ............................... 34/80 |
| 4,795,683 | A | * | 1/1989 | McElroy | ....................... 429/452 |

(Continued)

FOREIGN PATENT DOCUMENTS

| WO | WO 2006/035590 A2 * | 4/2006 | .............. H01M 8/06 |
| WO | 2007136706 | 11/2007 | |

OTHER PUBLICATIONS

Bradford; Frost and Sullivan Market Insight, Nov. 9, 2006 {http://www.frost.com/prod/servlet/market-insight-print.pag?docid=86496731}.*

(Continued)

*Primary Examiner* — Patrick Ryan
*Assistant Examiner* — Aaron Greso
(74) *Attorney, Agent, or Firm* — Geoffrey deKleine; Borden Ladner Gervais LLP

(57) ABSTRACT

The disclosure is directed at a method and apparatus for controlling fuel cell operating characteristics. In certain situations, the operating efficiency of fuel cells is degraded to external conditions. Providing a method and apparatus to control operating conditions for the fuel cell assists in improving the operating efficiency. This can be achieved by controlling certain environmental conditions, such as temperature and relatively humidity, in the area surrounding the fuel cell.

17 Claims, 5 Drawing Sheets

(56) References Cited

U.S. PATENT DOCUMENTS

| | | | |
|---|---|---|---|
| 5,667,713 A * | 9/1997 | Kuma | 219/544 |
| 6,492,044 B1 * | 12/2002 | Walsh | 429/457 |
| 2004/0091759 A1 * | 5/2004 | Harrington et al. | 429/22 |
| 2004/0191597 A1 | 9/2004 | McElroy | |
| 2006/0076632 A1 | 4/2006 | Palmateer et al. | |
| 2006/0219552 A1 * | 10/2006 | Sasaki et al. | 204/424 |

OTHER PUBLICATIONS

Canadian Intellectual Property Office, Office Action for CA Patent Application No. 2,706,247, Oct. 18, 2011.

European Patent Office, Extended European Search Report for EP Patent Application No. 11175882.7, Nov. 21, 2011.

European Patent Office, Extended European Search Report for EP Patent Application No. 09162110.2, Oct. 16, 2009.

* cited by examiner

Figure 3

| Temperature (degrees Celsius) | Relative Humidity (%) | Transmit signal to turn on heating element |
|---|---|---|
| T ≤ 22 | 0 ≤ RH ≤ 30 | YES |
| T ≤ 22 | 30 < RH | YES |
| 22 < T < 45 | 0 ≤ RH < 25 | YES |
| 22 < T < 45 | 25 ≤ RH ≤ 75 | NO |
| 22 < T < 45 | RH > 75 | YES |
| T > 45 | 0 ≤ RH ≤ 30 | NO |
| T > 45 | 30 < RH | NO |

SYSTEM AND METHOD FOR MANAGING FUEL CELL OPERATING CONDITIONS IN A MOBILE COMMUNICATION DEVICE

FIELD OF THE DISCLOSURE

The present disclosure relates generally to mobile communication devices. More particularly, the present disclosure relates to a method and system for managing fuel cell operating conditions in a mobile communication device.

BACKGROUND OF THE DISCLOSURE

The use of mobile communication devices continues to grow, and with that growth, different technologies are starting to be implemented within these devices. Currently, most, if not all mobile communication devices are powered by a rechargeable battery which is located within a battery housing and provides the necessary power to operate the device. Once the battery is drained, it can be recharged via the application of electrical energy to the battery. Future embodiments can be powered via other technologies such as fuel cells.

A fuel cell is an electrochemical conversion device which produces electricity from reactants such as a fuel (on the anode side) and an oxidant (on the cathode side), which react in the presence of an electrolyte. The reactants flow into the cell, and the reaction products flow out while the electrolyte remains within. Therefore, fuel cells can operate virtually continuously as long as the necessary flows are maintained such that they operate within a thermodynamically open system. However, use of a fuel cell can result in other operational concerns.

Fuel cells have a limited humidity operating range and experience severely degraded performance when the operating characteristics of the fuel cell are off-centre within the operating range. This degraded performance results in low output power and poor fuel efficiency which negatively affects operation of the device it is powering.

BRIEF DESCRIPTION OF THE DRAWINGS

Embodiments of the present system and method will now be described, by way of example only, with reference to the attached Figures, wherein:

FIG. 3 is a schematic view of a look-up table for use in the system;

DETAILED DESCRIPTION

It is an object of the present disclosure to obviate or mitigate at least one disadvantage of using fuel cells in a mobile communication device. In order to beneficially utilize a fuel cell within a mobile communication device, the operating characteristics of the fuel cell need to be carefully managed. In one embodiment, this can be achieved by adjusting the humidity or temperature around the critical parts of a fuel cell, such as the cathode, to a predetermined level via the use of a desiccant.

After it is determined that the operating characteristics of a fuel cell are not within a predetermined or preferred range, the system activates a desiccant in order to manage the characteristics, such as the humidity, temperature or surface resistivity so that they meet the predetermined range.

In one aspect, there is provided a system for controlling fuel cell operating characteristics of a fuel cell within a mobile communication device comprising: a desiccant actuating apparatus; and a desiccant, in close proximity to the desiccant actuating apparatus and the fuel cell whereby actuation of the desiccant actuating apparatus activates the desiccant.

In another aspect, there is provided a method for controlling fuel cell operating characteristics of a fuel cell within a mobile communication device comprising: determining that the fuel cell operating characteristics are outside of a desired range; and activating a desiccant to control the fuel cell operating characteristics.

In yet another aspect, there is provided a computer readable medium containing computer instructions which, when executed, perform a method for controlling operating characteristics of a fuel cell within a mobile communication device comprising: instructions for determining that the fuel cell operating characteristics are outside of a desired range; and instructions for activating a desiccant to control the fuel cell operating characteristics.

Generally, a method and system for managing or controlling fuel cell operating characteristics for a mobile communication device is disclosed.

Figure 4:
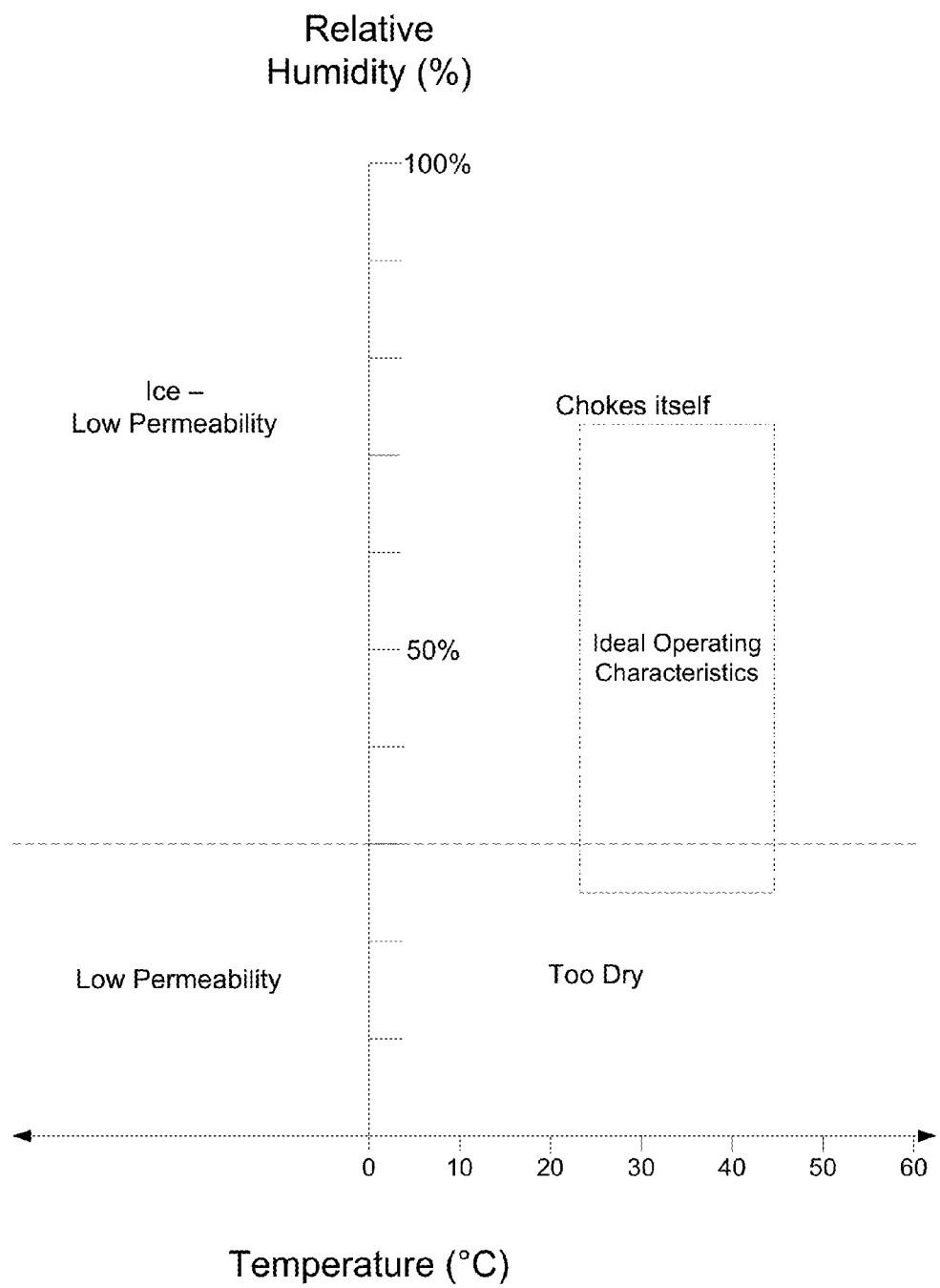
FIG. 4 is a chart showing the relationship between relative humidity and temperature with respect to fuel cell operation.

Referring first to FIG. 4, a chart outlining operating characteristics for a direct-methanol fuel cell (DMFC) is shown. As will be understood, the preferred operating characteristics, or operating range, is different for different types of fuel cells such as a proton exchange membrane fuel cell (PEMFC), a solid oxide fuel cell (SOFC) or a zinc air fuel cell. In the chart, the x-axis represents the temperature (in degrees Celsius) surrounding the fuel cell while the y-axis represents the percentage of relatively humidity (%) in the vicinity of the fuel cell.

When the temperature surrounding the fuel cell is less than zero, regardless of the relative humidity in the vicinity of the fuel cell, the fuel cell is in a low permeability state and could have ice buildup of some sort. When the temperature of the fuel cell is between 0 and 22 degrees Celsius and the relative humidity is between 0 and 30%, or the temperature is between 22 and 45 degrees Celsius and the relatively humidity is between 0 and 25% or the temperature is above 45 degrees Celsius and the relative humidity is between 0 and 30%, the fuel cell is typically too dry for operation and fuel cell performance or long-term reliability is degraded for the most part. When the temperature of the fuel cell is between 0 and 22 degrees Celsius and the relative humidity is above 30%, or the temperature is between 22 and 45 degrees Celsius and the relatively humidity is above 75%, or the temperature is above 45 degrees Celsius and the relative humidity is above 30%, the fuel cell tends to choke itself which means that it cannot breathe any oxygen. As can be seen, for the DMFC, the ideal operating characteristics occur when the temperature is between approximately 22 and 45 degrees Celsius and 25% to 75% relative humidity.

As will be understood, the measurements and numbers being reflected are for example purposes only. Different types of fuel cells and even different DMFCs can have different ideal operating characteristics.

When operating the mobile communication device under cold climate conditions, the buildup of ice on the fuel cell reduces the efficiency of the fuel cell as the cathode is unable to breathe, which can directly or indirectly cause reliability issues. Control of the fuel cell is via the fuel cell cathode which requires the ability to breathe or exposure to air. In the present application, control of the operating characteristics is performed with the assistance of a desiccant. A desiccant is a hygroscopic substance that induces or sustains a state of dryness in its local vicinity in a sealed container. Examples of desiccants include, but are not limited to, silica gel, calcium sulfate, calcium chloride, montmorillonite clay or molecular sieves. The desiccant assists in inducing or maintaining the operating characteristics of the fuel cell within a predefined range by controlling the properties such as the relative humidity surrounding the fuel cell, and more specifically, the cathode.

Figure 1:
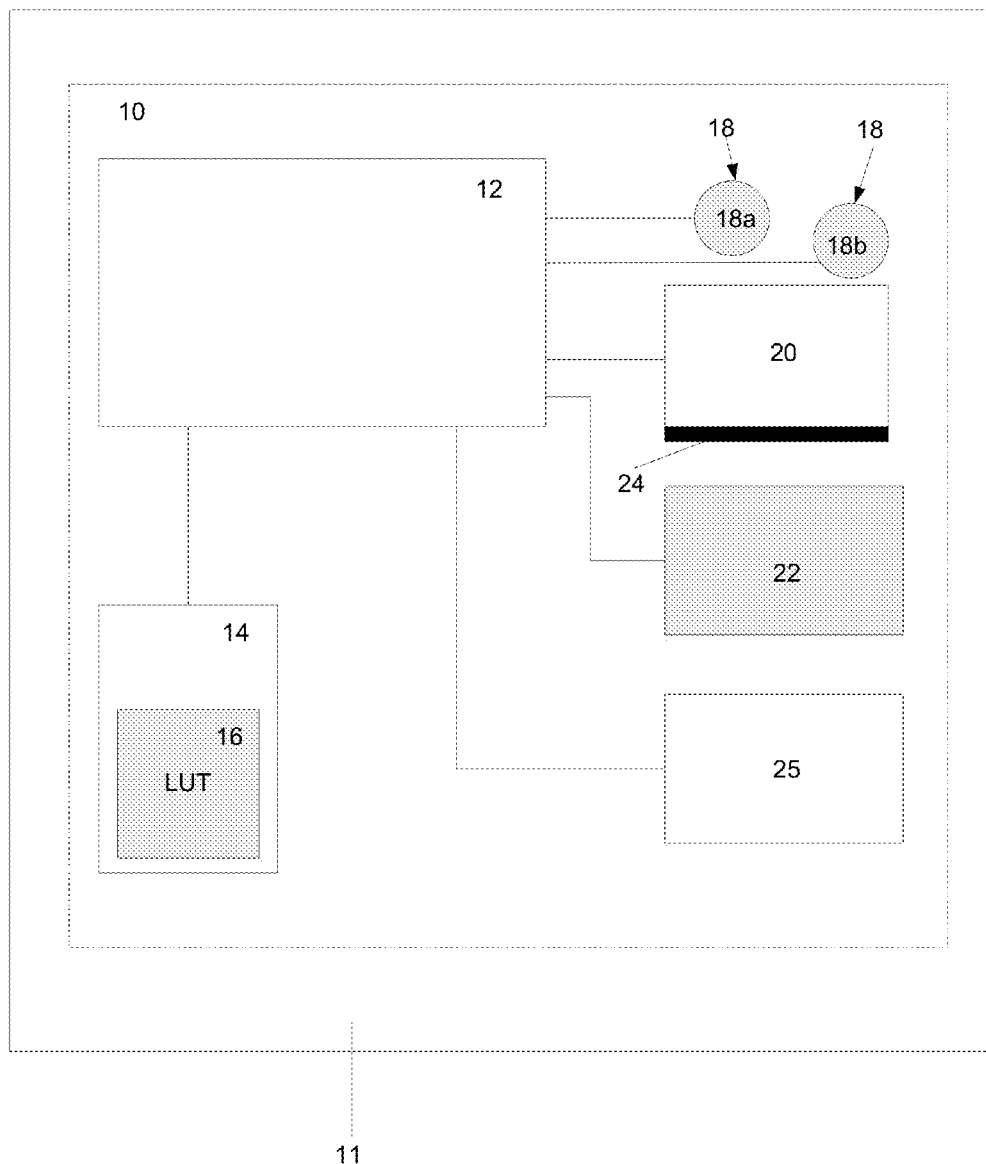
FIG. 1 is a schematic view of a system for managing fuel cell operating characteristics for a mobile communication device.

Turning now to FIG. 1, a schematic diagram of the system is shown. In this embodiment, the system 10, which is located within a mobile communication device 11, includes a processor 12 which is in communication with a database 14 storing a look up table (LUT) 16. A set of sensors 18 are in communication with the processor 12 to transmit signals representing readings that are sensed or captured by the individual sensors 18. In the embodiment of FIG. 1, one of the sensors 18a is used to measure the temperature around a fuel cell 20 and the other sensor 18b is used to measure the percentage of relatively humidity surrounding the fuel cell 20. As will be understood, multiple sensors 18 can be used to determine the temperature or relative humidity. The processor 12 is further in communication with a desiccant actuating apparatus, or heating element 22 to transmit signals based on the measurements or readings received from the sensors 18. Alternatively, the processor 12 can transmit signals to a battery 25 to power the heating element 22. The battery 25 can also be used to power the device 11 until the fuel cell 20 is operable. The heating element 22 is associated with a desiccant 24 (heated by the heating element 22) which assists in managing or controlling the operating characteristics of the fuel cell 20 so that the operating characteristics are within a predetermined, or desired operating range. In an alternative embodiment, the heating element 22 can be substituted by the use of a thermal collecting device (not shown) that collects and uses the heat that dissipates from other components within the mobile device 11. This heat can be directed towards the desiccant 24 via thermal path management and implemented with a series of switches in one embodiment of this configuration. The desiccant 24 can also be activated by a voltage, a current, sound waves or electricity.

The desiccant 24 is applied to the fuel cell 20 via a thin film, such as a nano-strip, which is adhered to the surface of the fuel cell 20. Alternatively, the desiccant 24 can be applied via spraying, coating, an integrated screen, or any other known methods. In the present application, the desiccant 24 can be regenerated via electrical or other stimuli or be replaced or refilled, preferably in a manner which is transparent to the user.

Figure 2:
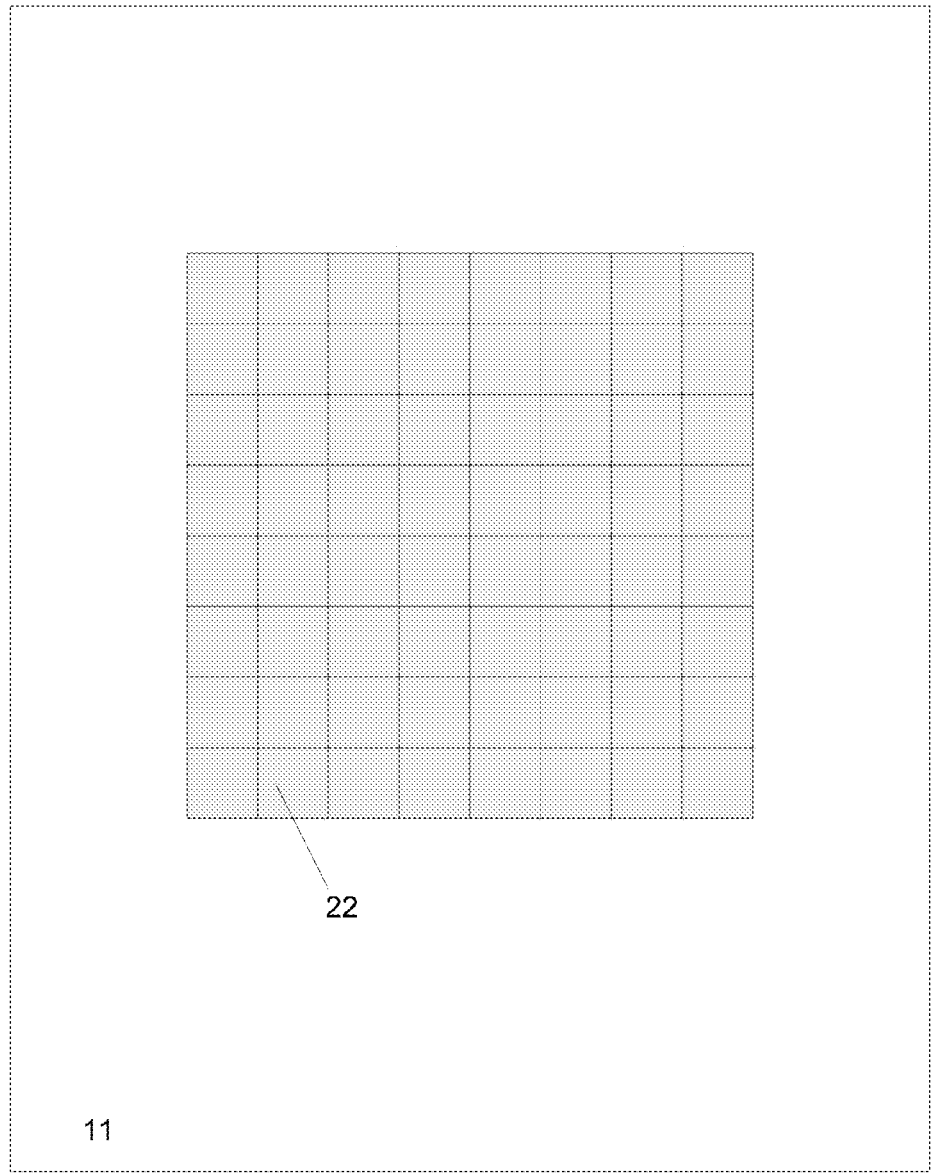
FIG. 2 is a rear view of a mobile communication device having a heating element mounted thereon.

Although the system 10 is shown to be entirely within the mobile communication device 11 in FIG. 1, the heating element 22 can be mounted on an external surface of the device 11, such as shown in FIG. 2 with the requirement being that the desiccant 24, located within the device 11, is in close enough proximity to the heating element 22 to be actuated by its heat. The heating element 22 can also be a standalone device that is mounted when necessary. In the case of the standalone device, the heating element 22 includes an apparatus for communicating with the processor 12, such as a USB connector or an apparatus for being powered by the device 11. Further embodiments include, but are not limited to, implementing a heating element 22 within a charging element, a carrying case, such as a holder or holster, fuel cell chargers or refueling devices.

In the present application, the desiccant 24 can be activated, deactivated or regenerated and can assist in reducing or eliminating cathode performance degradation to provide a wider, flatter humidity performance response. Furthermore, the desiccant 24 and heating element 22 combination provides improved fuel efficiency for a given temperature or humidity combination, as will be explained in further detail below.

The heating element 22, in one embodiment, is a mesh heater which is formed from a mesh of interleaved conductive and resistive wires. Electrical paths are established throughout the mesh by spot welding of the conductive and resistive wires at crossover points. Another embodiment of the heating element 22 can be a sheet or piece of thermally conductive material placed over a processor board whereby the material is heated by the processor board, or other device components, and the material emits heat to activate the desiccant 24. When power is supplied to the heating element 22, such as by the fuel cell 20, the hybrid battery 25 or even an external accessory, the wires heat up and electricity is conducted at the spot welds thereby activating, or heating up, the desiccant 24. The heat produced by the heating element 22 causes the desiccant 24 to induce or sustain a state of dryness in its local vicinity in the device 11. By placing the desiccant 24 proximal the fuel cell 20, the operating characteristics of the fuel cell 20 can be better managed. In the preferred embodiment, the desiccant 24 is placed in direct contact with the fuel cell 20, however, the desiccant 24 can be located within the device whereby it is sufficiently close enough to the fuel cell 20 to influence its ambient relative humidity or temperature.

In one embodiment of operation, after a set of measurements is taken by at least one of the sensors 18, these measurement values are transmitted to the processor 12. Once received, the processor 12 accesses the look up table 16 (as schematically shown in FIG. 3) to determine if a signal needs to be transmitted to the heating element 22. The data shown in FIG. 3 is for explanation purposes only and not meant to be representative of actual data stored within the, look-up table 16. Alternatively, the lookup table 16 can include a single value, such as a humiture value, instead of individual relative humidity and temperature values. Other methods of determining if the desiccant 24 needs to be actuated, include, but are not limited to, the setting of conditions whereby the desiccant 24 is activated when the operating characteristics are outside the conditions. This allows for the device to be self-started or to maintain optimal operation conditions.

If the look up table search reveals that a signal is required to turn on the heating element 22, the processor 12 instructs, via a signal, the heating element 22 to turn on. This is preferably achieved by various hardware, firmware or software implemented components such as relays or switches, as will be understood by one skilled in the art.

Figure 5:
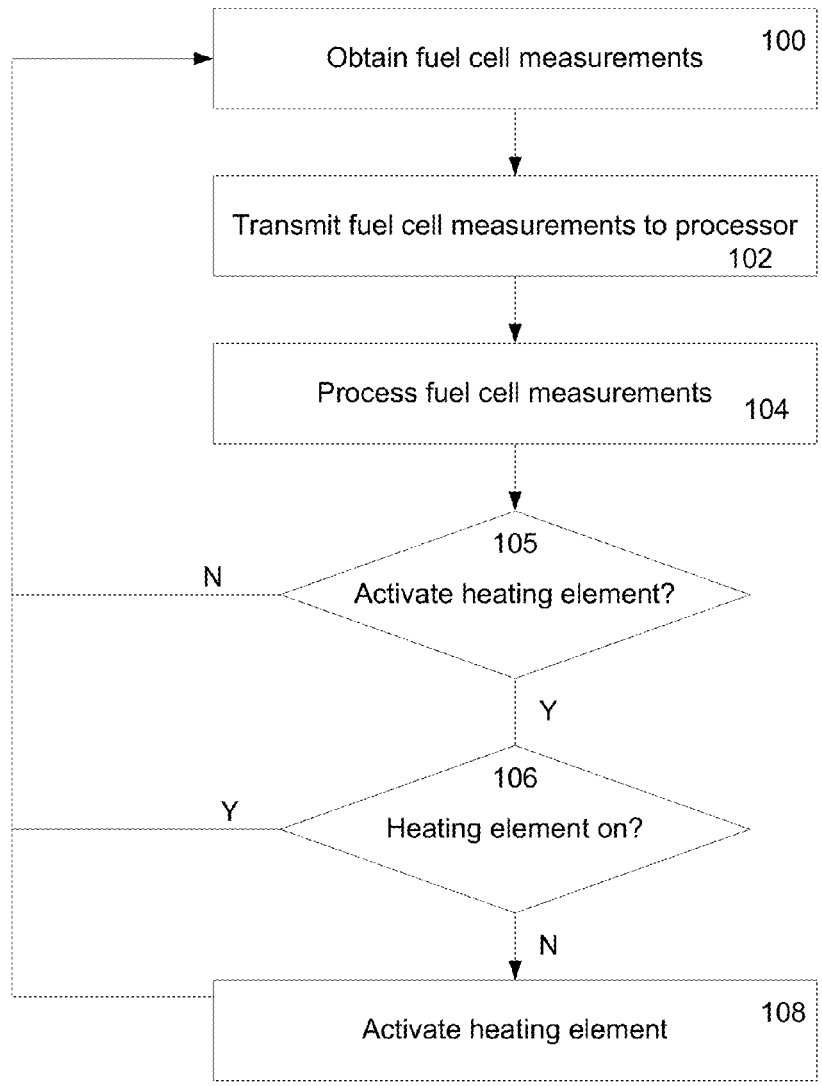
FIG. 5 is a flow chart outlining a method of managing fuel cell characteristics for a mobile communication device.

Turning to FIG. 5, a flowchart outlining a method of controlling operating characteristics of a fuel cell 20 within a mobile communication device 11 is shown. In the preferred embodiment, this method is executed continuously when the device 11 is operational, such as in an on or stand-by mode. Initially, fuel cell measurements are obtained (step 100), preferably by the set of sensors 18 located in the vicinity of the fuel cell 20. These fuel cell measurements can include, but are not limited to, the temperature surrounding the fuel cell, the relative humidity surrounding the fuel cell, the surface resistivity of the fuel cell or, the recent history of temperature. After the measurements are obtained, they are transmitted to the processor 12 (step 102). After receiving the measurements, the processor 12 processes the measurements (step 104) to determine if the desiccant 24 and therefore the heating element 22 has to be actuated (step 105). In one embodiment, the step of processing includes accessing a look-up table 16 within a database 14 to determine if any action is required in view of the measurements. Alternatively, a timer can be set for a special condition whereby when the condition is met, the timer counts down to the actuation of the heating element 22 or activation of the desiccant 24. In another embodiment, the fuel cell measurements can be transmitted to comparators that generate desiccant actuating apparatus or heating element control signals. The processor 12 compares the fuel cell measurements with values which have been previously stored in the look up table 16 to determine if the fuel cell operating characteristics have to be managed. If not, no action is required, further fuel cell measurements are obtained (step 100) and the process repeats.

If it is determined that action is required, a check is performed to see if the heating element 22 is already on (step 106). If the heating element 22 is on, the processor 12 returns to collecting fuel cell measurements (step 100). If the heating element is not on, the processor 12 transmits a signal to activate the heating element 22 (step 108). This can be achieved by transmitting a signal to a power supply, such as the battery 25 to supply power to the heating element 22, or by transmitting a signal to the heating element 22 to activate. Power is then provided to the heating element 22 via a series of relays or switches and other known components. The activation of the heating element 22 causes the desiccant 24 to induce a state of dryness in its local vicinity thereby reducing the relative humidity. This assists in managing the operating characteristics of the fuel cell as operating conditions are better controlled. After the heating element 22 is turned on, further fuel cell measurements are then collected (step 100). Turning the heating element 22 off can be achieved by various methods such as, but not limited to, monitoring the efficiency of the fuel cell 20, monitoring the fuel cell's output voltage and/or current, or by monitoring the fuel cell measurements taken after the heating element 22 is turned on. As will be understood, the heating element 22 can remain on even when the fuel cell measurements are within the ideal operating characteristics range in order to provide optimal reliability. In this manner, the table of FIG. 3 is defined by a manufacturer and does not have to be solely based on the ideal operating characteristics of the fuel cell.

In an alternative embodiment, the desiccant 24 is activated electrically or by controlling temperature and humidity conditions. In another embodiment, a thermoelectric generator can be used to assist in heating the desiccant 24 or to lower the relative humidity surrounding the fuel cell 20.

In another embodiment, the heating element 22 or desiccant 24 can be activated by an input signal received by the processor 12. In this embodiment, when the mobile communication device 11 is turned on, a user of the device 11 can immediately request that the desiccant 24 be activated by clicking a button which, in turn, transmits a signal to the processor 12 to activate the desiccant 24. In yet another embodiment, the heating element 22 can be turned on during a device warm-up cycle request.

In another embodiment, the method is executed on a computer readable medium.

In the preceding description, for purposes of explanation, numerous details are set forth in order to provide a thorough understanding of the embodiments. However, it will be apparent to one skilled in the art that these specific details are not required in order to practice the method and system. In other instances, well-known electrical structures and circuits are shown in block diagram form. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A system for controlling fuel cell operating characteristics of a fuel cell within a mobile communication device comprising:
    a desiccant actuating apparatus; and
    desiccant, in close proximity to the desiccant actuating apparatus and the fuel cell, whereby actuation of the desiccant actuating apparatus activates the desiccant;
    wherein the desiccant is adhered directly to the fuel cell.

2. The system of claim 1 further comprising:
    a processor for transmitting a signal to activate the desiccant actuating apparatus.

3. The system of claim 2 wherein the processor further comprises:
    a database storing a lookup table including previously stored values for fuel cell operating characteristics.

4. The system of claim 2 further including a set of sensors for sensing fuel cell measurements.

5. The system of claim 4 wherein the set of sensors are in communication with the processor to transmit the fuel cell measurements.

6. The system of claim 1 wherein the desiccant is adhered via a nano-strip to the fuel cell.

7. The system of claim 1 wherein the desiccant actuating apparatus is a heating element.

8. The system of claim 7 wherein the heating element is a mesh heater.

9. The system of claim 1, wherein the desiccant actuating apparatus is located within the mobile communication device.

10. The system of claim 1, wherein the desiccant actuating apparatus is mounted externally on the mobile communication device.

11. A method for controlling fuel cell operating characteristics of a fuel cell within a mobile communication device comprising:
    determining that the fuel cell operating characteristics are outside of a desired range; and
    activating a desiccant to control the fuel cell operating characteristics;
    wherein the desiccant is adhered directly to the fuel cell.

12. The method of claim 11 wherein the step of determining comprises:
    obtaining fuel cell measurements; and
    comparing the fuel cell measurements with previously stored values to determine if the fuel cell operating characteristics are outside the desired range.

13. The method of claim 11 wherein the step of determining comprises:
    receiving an input signal indicating that the desiccant should be activated.

14. The method of claim 11 wherein the step of determining comprises:
    receiving a warm-up cycle request.

15. The method of claim 11 wherein the step of activating comprises:
   actuating a desiccant actuating apparatus.

16. The method of claim 15 wherein the step of actuating comprises:
   transmitting a signal to power up the desiccant actuating apparatus.

17. A computer readable medium containing computer instructions which, when executed, perform a method for controlling operating characteristics of a fuel cell within a mobile communication device comprising:
   instructions for determining that the fuel cell operating characteristics are outside of a desired range; and
   instructions for activating a desiccant to control the fuel cell operating characteristics; wherein the desiccant is adhered directly to the fuel cell.

\* \* \* \* \*